H. W. & S. H. HENKE.
SPEED INDICATOR.
APPLICATION FILED JAN. 3, 1918.

1,271,467.

Patented July 2, 1918.

Inventors
Harold W. Henke and
Sidney H. Henke
Attorney

UNITED STATES PATENT OFFICE.

HAROLD WALTER HENKE AND SIDNEY HERBERT HENKE, OF LEWISHAM, LONDON, ENGLAND.

SPEED-INDICATOR.

1,271,467.  Specification of Letters Patent.  Patented July 2, 1918.

Application filed January 3, 1918. Serial No. 210,165.

*To all whom it may concern:*

Be it known that we, HAROLD WALTER HENKE and SIDNEY HERBERT HENKE, subjects of His Majesty the King of England, both residing at Lewisham, in the county of London and Kingdom of England, have invented certain new and useful Improvements in Speed-Indicators, of which the following is a specification.

This invention relates to speed indicators, and has for its object to provide an instrument which is more simple in construction and of greater efficiency than the instruments of its kind heretofore produced.

According to the invention a fan rotated by a shaft driven from the motor, apparatus or machine the speed of which is to be indicated, produces a current of air which acts upon a second and spring controlled fan operatively connected to a pointer and flows in a direction which is parallel to the axes of said fans.

A convenient construction of the improved instrument provided by the invention will now be described with reference to the accompanying drawings, in which:—

Figure 1:
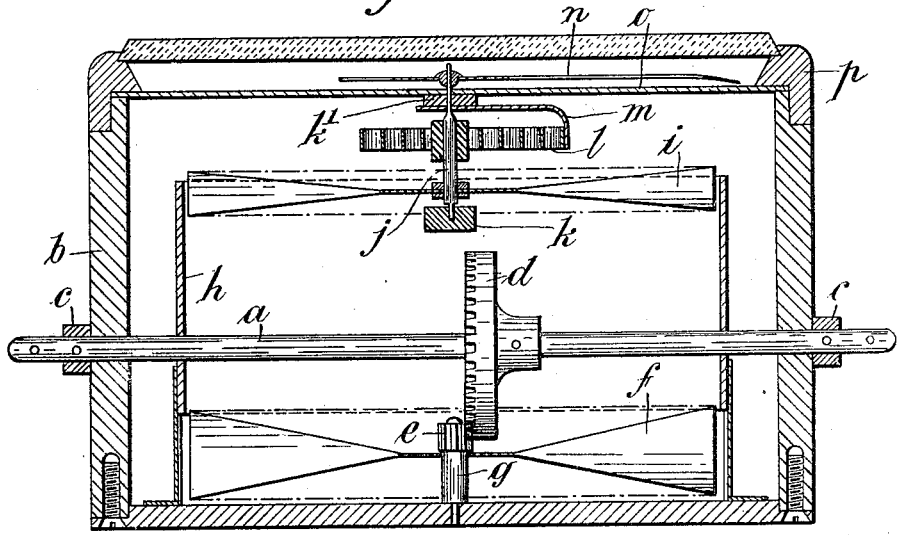
Figure 1 is a plan of the instrument showing the cover removed.
Figure 2:
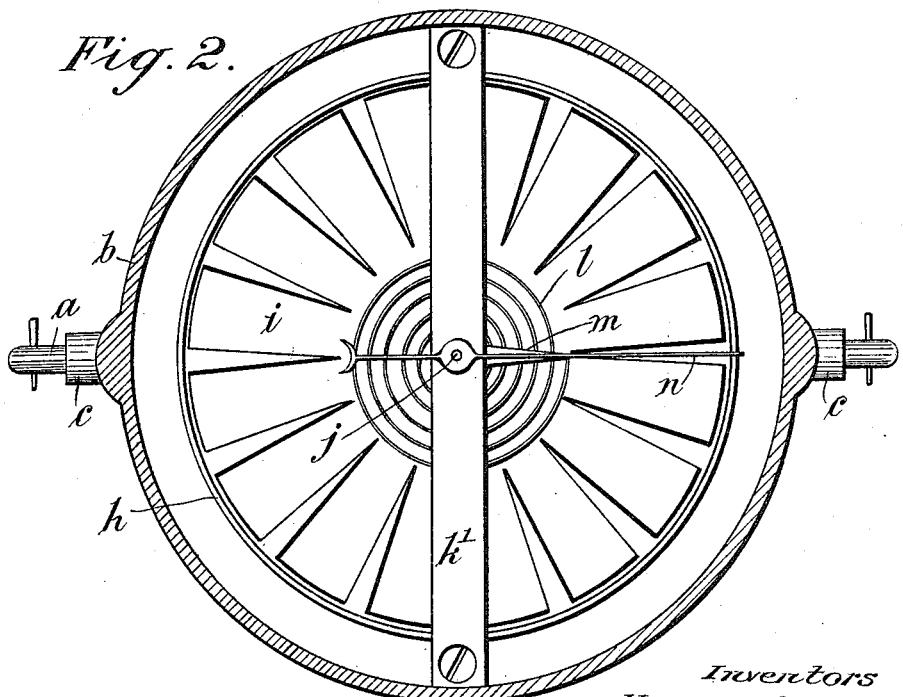
Fig. 2 is a sectional elevation of the same.

A shaft $a$ is rotatably carried by a case $b$ and has both of its ends projecting beyond the sides of the latter so that it can be driven in both directions to provide for speed indication forward and reverse, and thrust collars $c$, $c$ secured on said shaft bear against the case. A crown toothed wheel $d$ secured on the shaft $a$ meshes with a toothed pinion $e$ fastened on the spindle of a propeller-like fan $f$, and said fan is rotatably mounted on a bearing support $g$ and is disposed at the lower end of a cylindrical partition $h$ rigidly fastened with and spaced from the case.

A second propeller-like fan $i$ is positioned at the upper end of the cylindrical partition $h$ and has its arbor $j$ mounted in two bridge bearings or cross bars $k$ $k'$. A coiled spring $l$ surrounding the arbor $j$ has one of its ends secured to the latter and its other end to a rigid arm $m$ fastened to the bridge $k'$, and a pointer $n$ on the arbor moves over a suitably graduated dial $o$. A cover or glazed bezel $p$ is fitted over the pointer and the dial.

In operation the rotation of the shaft $a$ causes the fan $f$ to revolve by medium of the transmission gearing $d$, $e$, and said fan produces a current of air which circulates through the cylindrical partition $h$ in a direction parallel to the axes of the two fans $f$ and $i$, and between said partition and the case $b$ also in a direction parallel to the axes, and the velocity of such air current is dependent upon and varies with the speed of rotation imparted to the shaft $a$ and the fan $f$. The current of air acts upon the fan $i$ and tends to rotate the latter, but such rotation is retarded by the action of the spring $l$ so that, as will be appreciated, the fan $i$ will partially rotate and, with it, the pointer $n$ will swing over the dial $o$ to a greater or less degree proportionate with the pressure of the air current and the speed of rotation of the shaft $a$.

What we claim is:—

A speed indicator, comprising a casing adapted to be vertically arranged, a substantially vertical tubular partition arranged within said casing, a horizontal fan rotatable within the outer casing at the lower end of the tubular partition, a gear arranged above and connected with said fan, a horizontal shaft arranged near and above the fan and extending through the tubular partition and said casing with its opposite ends extending outwardly beyond the casing so that either end of the horizontal shaft may be connected with the driving means, means to prevent longitudinal movement of the horizontal shaft, a vertical gear connected with the horizontal shaft and engaging the first named gear, a substantially horizontal bar arranged near the upper end of the tubular partition and connected with the casing, a vertical shaft rotatably connected with the bar, an upper horizontal fan arranged in proximity to the upper end of the tubular partition and rigidly secured to the vertical shaft, a pointer connected with the vertical shaft, a relatively stationary arm disposed near the vertical shaft, and a coil spring surrounding the vertical shaft and having one end thereof connected with the vertical shaft and its opposite end connected with said arm.

In testimony whereof, we have hereunder subscribed our names.

HAROLD WALTER HENKE.
SIDNEY HERBERT HENKE.

Copies of this patent may be obtained for five cents each, by addressing the "Commissioner of Patents, Washington, D. C."